United States Patent [19]

Smyth et al.

[11] 4,081,065
[45] Mar. 28, 1978

[54] CONTROLLED POWER CLUTCH

[76] Inventors: Robert R. Smyth, Morningside La., Lincoln, Mass. 01773; William B. Smyth, 2979 Forest Dr., Pepper Pike, Ohio 44124

[21] Appl. No.: 753,639

[22] Filed: Dec. 23, 1976

[51] Int. Cl.² .................... F16D 23/00; F16D 23/10; F16D 47/00
[52] U.S. Cl. ................................................. 192/.076
[58] Field of Search .................... 192/.032, .033, .076

[56] References Cited

U.S. PATENT DOCUMENTS

| 2,144,074 | 1/1939 | Maybach | 192/.076 |
|---|---|---|---|
| 2,163,903 | 6/1939 | Whittington | 192/.076 |
| 2,478,058 | 8/1949 | Schantz | 192/.076 |
| 2,774,452 | 12/1956 | Wisman | 192/.076 |
| 3,129,794 | 4/1964 | Altmann et al. | 192/.076 |
| 3,237,734 | 3/1966 | Jania | 192/.076 |

Primary Examiner—Lloyd L. King
Attorney, Agent, or Firm—Kenway & Jenney

[57] ABSTRACT

A controlled power clutch in which a series of signals are developed to represent engine speed, engine acceleration and throttle position, as well as a signal representing the heat buildup within the clutch over a period of time. The clutch has substantially conventional mechanical components. The clutch includes a control means for controlling the engagement of the mechanical clutch elements and particularly to control the amount of partial engagement in the transition from the clutch being completely disengaged to being completely engaged, the amount of partial engagement being adjusted in response to throttle position and acceleration of the drive shaft.

13 Claims, 7 Drawing Figures

CONTROLLED POWER CLUTCH

FIELD OF THE INVENTION

This invention relates in general to automotive clutches and more particularly to a controlled power clutch for use in heavy duty vehicles.

BACKGROUND OF THE INVENTION

The operation of conventional clutch arrangements for heavy duty vehicles requires a relatively high level of operator skill in order to provide for smooth starts and shifts, particularly when the vehicle is heavily loaded. This expertise is required for the driver to appropriately correlate accelerator position and the rate at which the clutch is engaged when changing the clutch from a fully disengaged to a fully engaged position. If the engine speed is too high and the clutch is engaged suddenly, there is a tendency for the truck to rear or buck before the entire vehicle attains proper forward motion. If on the other hand the engine speed is too low to provide sufficient power to move the vehicle, then the engine may stall as a result of the clutch engagement. In addition to these operational characteristics, failure to smoothly and properly complete the engagement of the clutch in relation to the engine speed and amount of engine acceleration can result in excessive loading factors on the various elements in the drive train with resultant shortened life characteristics of these elements. Additional adverse effects may arise from allowing the clutch to engage too slowly and to slip such that excessive heat is generated in the clutch causing thermal damage in the clutch elements themselves.

In order to eliminate the degree of skill required by the driver and to obtain long life in the drive train and clutch components, various techniques have been employed to produce automatically controlled clutches. With automatically controlled clutches, not only may the above referred to problems be overcome, but, additionally, the physical requirements for the driver become easier and the entire shifting operation can more nearly approximate that of an automatic transmission in a passenger car. One approach to automatic clutch engagement, which has not proved suitable for heavy duty automotive clutches, is one in which there is not completed positive coupling, that is, where the drive shaft is not ever completely mechanically linked to the driven shaft, but rather various degrees of coupling are permitted and by controlling the degree of coupling in accordance with engine speed, a controlled relationship between the speed of the driven shaft and the drive shaft may be achieved. However, such clutches, which usually employ electromagnetic coupling, are inefficient inasmuch as there is never a complete positive linkage and additionally, such couplings usually generate considerable heat from the lost power in the non-complete coupling.

Another approach has involved the use of a clutch control mechanism in which the clutch is moved from a completely disengaged position through an intermediate controlled series of positions to a final engagement in which there is a positive mechanical linkage. Such a system is described in U.S. Pat. No. 2,144,074 issued Jan. 17, 1939. In this system, in a first stage after initiation of re-engagement, the clutch members are moved slowly toward engagement until a specific engine speed is reached and, at this engine speed a second stage is initiated in which the clutch engagement is controlled in accordance with engine speed in a predetermined relation. In the final stage the clutch engagement is completed. In this system, however, there is no relationship established between throttle position and the amount of clutch engagement, or between the acceleration of the engine and clutch engagement. Thus, the relationship between the engine speed and clutch engagement is a fixed one, irrespective of the throttle position. Additionally in this technique, there is no provision for limiting the heat dissipation in the intermediate stage to prevent excessive thermal damage to the clutch components.

SUMMARY OF THE PRESENT INVENTION

Broadly speaking, in the present invention a controlled power clutch is provided which is suitable for heavy duty vehicles. In this arrangement, the basic mechanical components of the clutch are conventional and are arranged in a conventional fashion. The clutch has a completely disengaged position in which there is no coupling between the drive shaft and the driven shaft and a completely engaged position in which the clutch engagement is positive providing a direct mechanical linkage between the drive shaft and the driven shaft. The engagement of the clutch intermediate this disengaged position and the finally engaged position is controlled electronically in response to a series of signals developed to represent engine speed, engine acceleration, and throttle position as well as a value representing the heat buildup within the clutch over a period of time. The clutch disk is driven into and out of engagement by means of an actuator. The control signals for the actuator are supplied from the circuitry which acts to maintain the function, E, at a minimum where the function is represented by the equation, $$E = N - A + K\frac{dN}{dt}$$

where
N = the engine speed
dN/dt = the acceleration of the engine
A = the throttle position
K = a weighting factor
E = error If the error E is positive, the actuator operates to engage the clutch. If E is negative, the actuator operates to disengage the clutch.

This control equation is operative only when the clutch is to be engaged. To disengage either additional control signals such as may be supplied by a switch are used; or the value of A is made small or zero by other means.

When a controlled engagement such as starting the vehicle from rest is to be made the following sequence occurs. The disengaging signal is removed and A is set to the desired value by the driver's act of depressing the throttle. With the throttle depressed, the speed N of the unloaded engine will increase. At some point the error E will become positive causing the actuator to start engaging the clutch. This process continues until the load on the engine equals the torque available from the engine at the particular throttle setting.

The torque, transmitted through the clutch to the rear wheels, will cause the vehicle to accelerate. As the vehicle speed increases, the driven clutch plate speed will increase. When the speed of driven plate equals the speed of the engine, increased clutch engagement will no longer hold the engine speed down. Typically, the engine speed will continue to increase, increasing E, causing the clutch to be rapidly driven to full engagement.

Since engine speed-torque characteristics are a function of throttle opening, the driver can control the starting characteristics. Normally, the more the driver depresses the throttle the greater the available engine torque. The clutch will engage to deliver this greater torque to the vehicle's wheels. By adjusting the throttle the driver can balance the engine torque to just equal the desired vehicle tractive effort at some vehicle speed less than that which would produce full engagement. This allows the vehicle to creep at low speeds or even to hold stationary position on an up grade.

When operating under slip conditions, substantial heat is dissipated in the clutch. Direct or indirect measurements of clutch temperature or determination of the power dissipated in the clutch can be used to further modify the value A. With this additional control, damage to the clutch resulting from excessive heat can be prevented.

Figure 1:
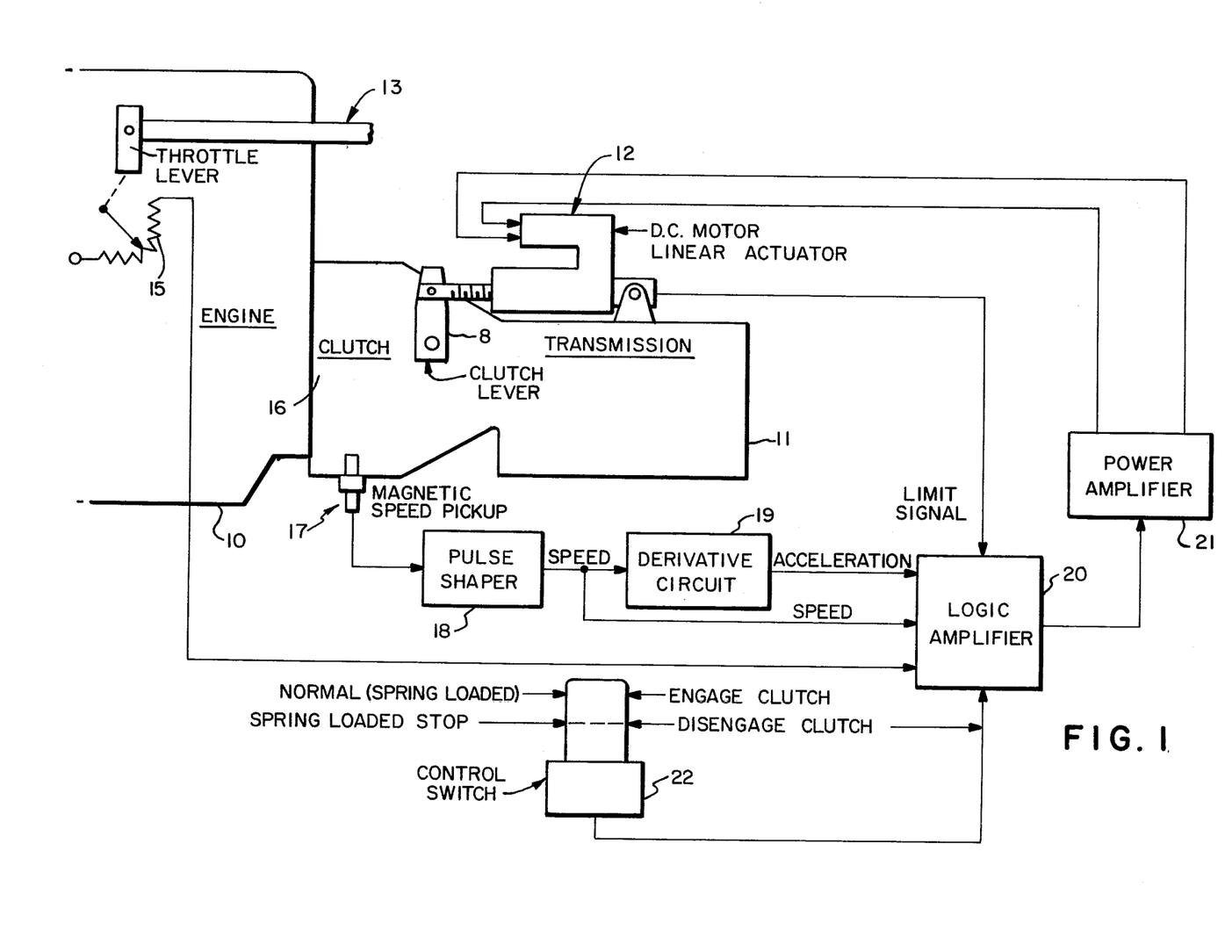
FIG. 1 is an illustration in block diagrammatic form of a controlled clutch constructed in accordance with the principles of this invention.

With reference now to FIG. 1, a heavy duty automotive transmission 11 includes a main clutch 16 for coupling a crankshaft of an engine 10 to a driven shaft in transmission 11. The engine is controlled by means of an adjustable throttle lever 13. A potentiometer 15 provides an output signal indicating the position of the throttle lever 13. The clutch 16 position is controlled by means of a clutch lever 8, the position of the lever being controlled by DC motor linear actuator 12. Such actuators are available, for example, from the Warner Brake & Clutch Company of Beloit, Wisconsin. The position of the DC motor and the actuator 12 is controlled by the output current from a power amplifier 21, which is itself supplied with signals from a logic amplifier 20. The inputs to the logic amplifier 20 include a pair of signals derived from a magnetic speed pickup 17 which senses the rotational speed of the drive shaft of the engine 16 and provides a signal representing this speed to a pulse shaper 18, the output from the pulse shaper being supplied both directly as an input to the logic amplifier 20 and through a derivative circuit 19 to the logic amplifier 20. The signal which has been processed through the derivative circuit 19 represents, then, the acceleration of the engine's crank-shaft. The signal derived from potentiometer 15 representing the adjustable position of throttle lever 13 is also supplied as an input to the logic amplifier 20. The operation of the logic amplifier 20 is controlled by means of a control switch 22 which, typically would be a foot operated two-position switch. In its normal spring biased position, the clutch is engaged, while in its depressed condition the clutch is disengaged. Additional inputs may be supplied to the logic amplifier 20. For example, a signal representing heat buildup in the clutch beyond that which is a tolerable limit, may be supplied to this amplifier.

In operation the driver, when he wishes to disengage the clutch, switches control switch 22 into its disengaged position. Under these circumstances the mechanical portions of the clutch become completely disengaged since the linear actuator 12 is stroked at full speed in the out direction, that is, disengaging the mechanical elements of the clutch. The linear actuator 12 includes limit switches that provide output limit signals when the actuator is either at its extreme out or extreme in position. The limit signals are supplied to the logic amplifier 20 and, when the actuator is completely out, this signal shuts off the power signal to the actuator. In order to re-engage the clutch, the driver releases the control switch 22 returning it to its normally spring biased position. Simultaneously the driver depresses the throttle in order to start the vehicle moving. Under these circumstances the logic amplifier 20 provides full current to the power amplifier 21 and thence to the actuator 12 to drive the actuator to commence re-engagement of the mechanical clutch elements. As engagement of these elements commences, the logic amplifier 20 develops an output signal to the power amplifier 21 proportional to the expression:

$$N - A + K\frac{dN}{dt},$$

where
 N = the engine speed
 A = the throttle position signal adjusted to provide desired engagement characteristics, e.g. at full throttle this signal could equal the speed signal N at peak torque speed of the engine and at the closed throttle position it could equal the idle speed value of N,
 K = a constant representing an appropriate weighting factor for the inertial effect of a change in engine speed on the torque output of the engine,
 dN/dt = the acceleration of the engine.

Thus in the initial stage, the driver presses the accelerator to a position, which will depend upon whether he needs to make a gentle start or a severe start and, as the clutch starts to engage, the engine may accelerate to a speed above the corresponding value of the throttle adjustment and the value of N − A becomes positive. Since the engine is accelerating, the overall value of the relationship N − A + K dN/dt is positive and the actuator 12 receives a signal causing the clutch to continue to engage. When the torque loading of the engaged clutch starts to decelerate the engine to the point where the above expression equals zero, then there will be no further engagement of the clutch elements since the signal to the power amplifier 21 has become substantially zero. Once the vehicle accelerates to a speed equal to the throttle adjustment speed, the engine will start to speed above the set throttle speed and the relationship N − A + K dN/dt becomes positive again, providing a signal from the amplifier 21 to the actuator 12 driving that actuator toward fuller engagement of the clutch elements. However, since the vehicle is now traveling at engine speed, further engagement of the clutch does not provide additional torque loading and the actuator continues to drive the clutch elements, until they are completely engaged.

In order to limit the heat dissipation in the engine, a signal is provided which is proportional to the integral of both the throttle position and the drive shaft speed, for a period commencing from the time at which the clutch starts to engage. Once this integral has exceeded a predetermined value, automatic disengagement of the clutch can be instituted to prevent excessive heat dissipation. Such conditions may occur when start up of the engine is such that the clutch would be maintained in a slipping condition over too long a period. The operator can be given an output indication of this condition and a control provided allowing him to override the control circuitry and either fully engage or fully disengage the clutch manually.

Figure 2:
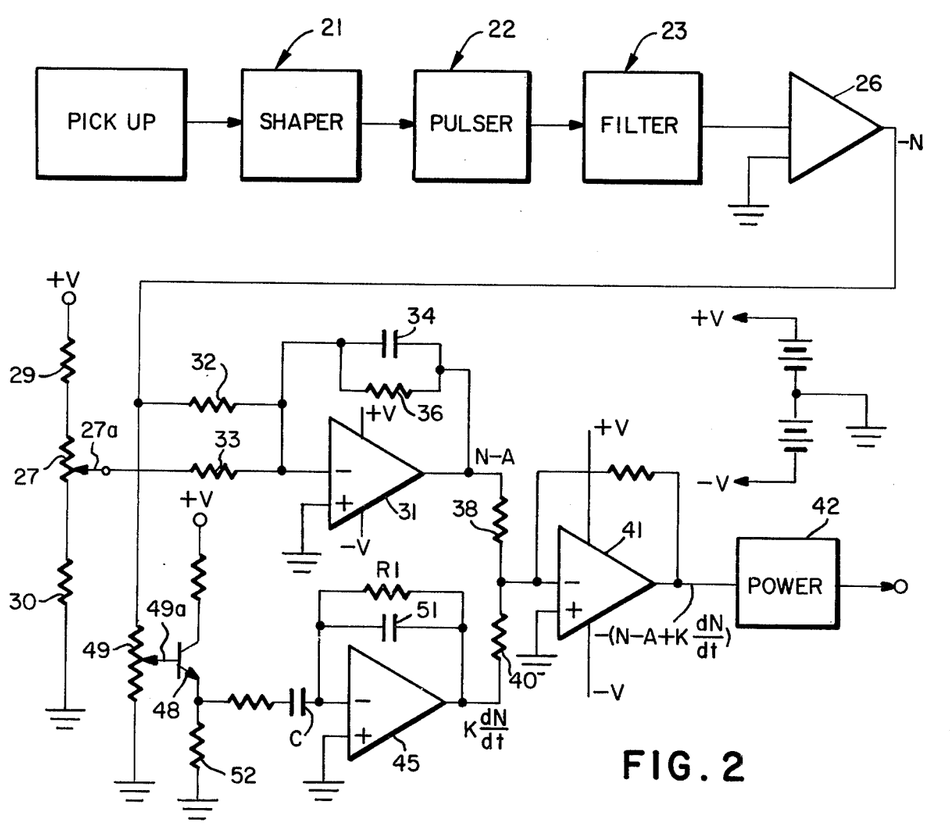
FIG. 2 is an illustration partially in block diagrammatic and partially in schematic form of control and logic circuitry useful in the controlled clutch constructed in accordance with the principles of this invention.
Figure 4:
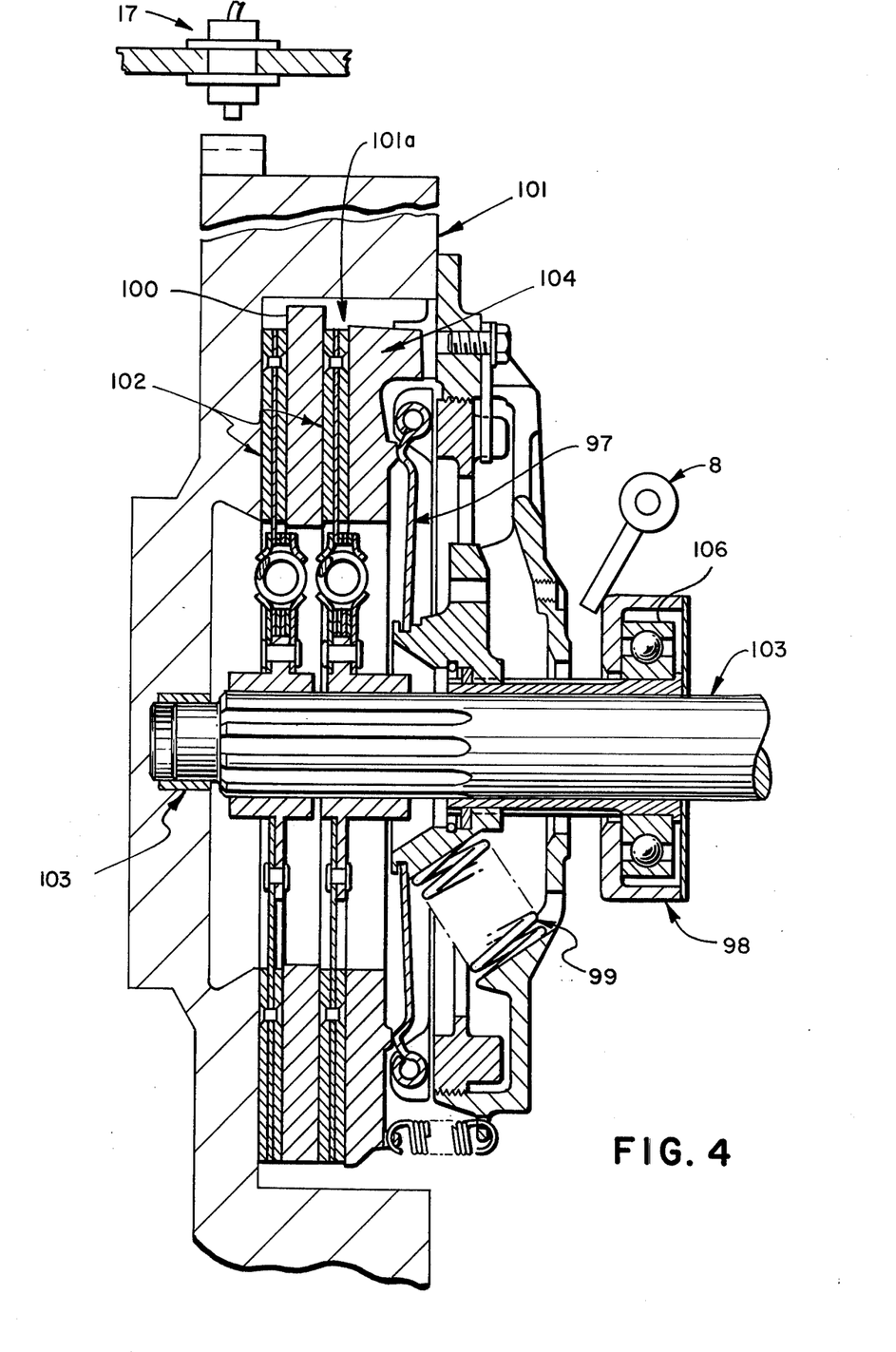
FIG. 4 is an illustration in cross sectional view of the mechanical components of a clutch suitable for use in a control power clutch constructed in accordance with the principles of this invention.

In FIG. 2 there is illustrated circuitry for controlling the mechanical clutch components of a clutch arrangement as illustrated in FIG. 4.

FIG. 4 shows a cross section of a typical two plate mechanical clutch which is mounted to an engine fly wheel 101. Lugs 101a on the inner radius of the fly wheel 101 engage corresponding slots in the clutch pressure plate 104 and intermediate plate 100 causing these elements to rotate at engine speed. They are however, free to move in an axial direction. Clutch driven disks 102 are splined to the transmission input shaft 103. Clutch torque is provided by engaging springs 99 acting thru levers 97 to apply a pressure to the pressure plate 104. This pressure squeezes the driven disks 102 and intermediate plate 100 between the pressure plate 104 and the engine fly wheel 101. The magnitude of the clutch torque is proportional to this pressure.

The force provided by the springs 99 on the pressure plate 104 can be controlled by the axial position of the throwout bearing assembly 98. Throwout bearing assembly 98 can be moved in the axial direction by the cross-shaft and control lever 8. The cross-shaft is mounted in the clutch-housing (not shown) such that movement of the clutch control lever 8 will cause an axial movement of the throwout bearing assembly 98. In this manner, movement of control lever 8 can vary the force on pressure plate 104 and therefore the available clutch torque.

Magnetic pickup 17, mounted in the clutch-housing (not shown), detects tooth passages of the gear teeth located on the outer radius of engine fly wheel 101. The frequency of the signal provided by pickup 17 is thereby proportional to engine speed.

The signal from pickup 17 is provided to a shaper 21, which generates a series of rectangular pulses from the zero crossing of the sensor output and provides these shaped pulses to a pulser 22 which generates a series of constant width, constant height pulses for each pulse produced from the shaper 21. These output pulses from the pulser 22 are provided to a filter 23 which passes only the DC component thus providing at the input to amplifier 26 a signal which has a voltage level proportional to the speed of rotation of the engine. The output, then, from amplifier 26 is proportional to −N and this output is provided through resistor 32 as one input signal to the summing input junction of amplifier 31. A second input to this summing junction of amplifier 31 is provided through resistor 33 from potentiometer 27, which is in series with fixed resistors 29 and 30 between a positive voltage source, +V, and ground. The position of the arm 27a of potentiometer 27 is mechanically linked to the throttle adjustment so that the electrical signal on arm 27a varies with variations in the adjustment of that throttle. Thus amplifier 31 sums a signal −N and +A and at the output of amplifier 31, the signal is proportional to N − A.

The signal −N from amplifier 26 is also provided across potentiometer 49 and an adjustable arm 49a from this potentiometer is connected directly to the base of transistor 48, which has its collector connected to a source of positive voltage, +V, and its emitter connected to ground through resistor 52. The transistor 48 is connected as an emitter follower and the emitter is connected through capacitor C to the input of amplifier 45. The amplifier 45 has a feedback resistor R and, thus connected, the amplifier serves as a differentiator such that the output from amplifier 45 is KdN/dt, where K is a weighting factor which can be adjusted by adjustment of the potentiometer arm 49a on potentiometer 49. This output KdN/dt from amplifier 45 is connected through resistor 40 to the summing junction of amplifier 41 and the output N −A from amplifier 31 is also connected through resistor 38 to this same summing junction. Thus the output from amplifier 41 is a signal proportional to $$-(N - A + K\frac{dN}{dt})$$

and this signal is supplied as the actuating signal to power stage 42, which in turn controls the linear actuator 12.

Figure 3:
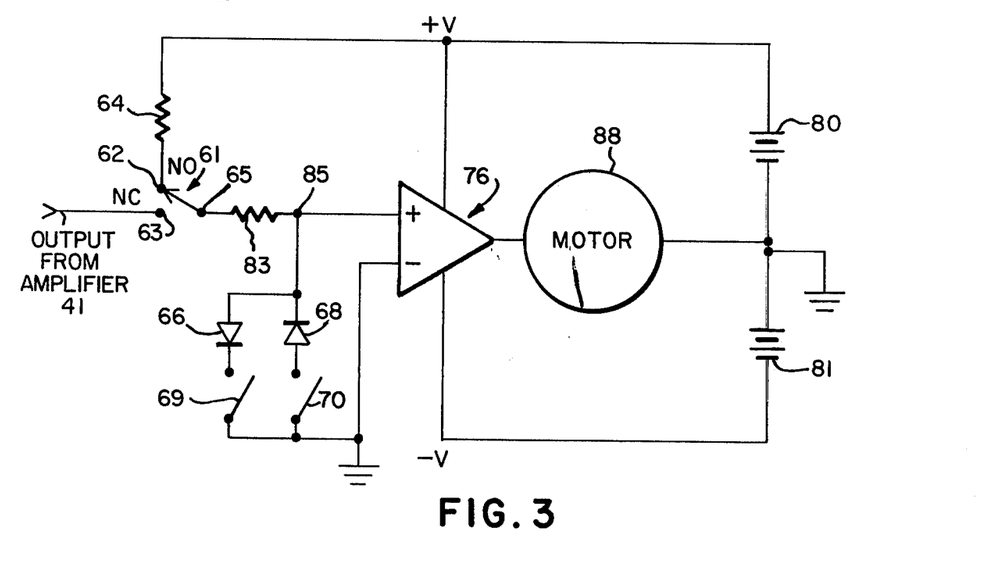
FIG. 3 is an illustration partially in schematic and partially in diagrammatic form of a power stage and switching circuit useful in conjunction with the control circuit of FIG. 2.

In FIG. 3 there is illustrated the output stage and associated switching circuits for operation of the linear actuator 12, the output from amplifier 41 is one input to this stage. The operator actuates switch 61 to cause clutch engagement or disengagement. To disengage the arm of the switch is connected thru normally open switch contact 62, thru resistor 64 to the positive voltage supply. To engage switch 61 is in the normally closed position with the arm of the switch connected to the output of amplifier 41 thru switch contact 63.

The input terminal, 85, of power amplifier 76 is connected to the arm of the switch 69 thru resistor 83.

Also connected to the input terminal 85 are the cathode and anode respectively of diodes 66 and 68. The anode of diode 66 is connected thru switch 69 to ground. Similarly, the cathode of diode 68 is connected thru switch 70 to ground. The output of power amplifier 76 is connected to one terminal of actuator motor 88. The other terminal of motor 88 is connected to ground. Positive and negative voltage to amplifier 76 is supplied by batteries 80 and 81.

The switches 69 and 70 are limit switches, switch 69 being closed when the actuator 12 has completely disengaged the mechanical clutch components, and switch 70 being closed when these same clutch components are completely engaged.

When the driver operates switch 61 to disengage the clutch, a positive voltage is supplied to junction 65 thru resistor 64. Unless the clutch is fully disengaged, switch 69 will be open, allowing junction 85 to become positive. The output of amplifier 76 will go positive operating motor 88 to drive the motor towards disengagement. When the full disengaged position is reached switch 69 will close shorting junction 85 thru diode 66 to ground, thereby removing the driving voltage to the actuator motor 88.

When the clutch is to be engaged, the driver allows switch 61 to return to its normally closed position, connecting the output of amplifier 41 to junction 65. The clutch can now be driven towards engagement in response to the signal from amplifier 41. When completely engaged switch 70 closes prohibiting further drive motor operation in the engaging direction.

Figure 5A:
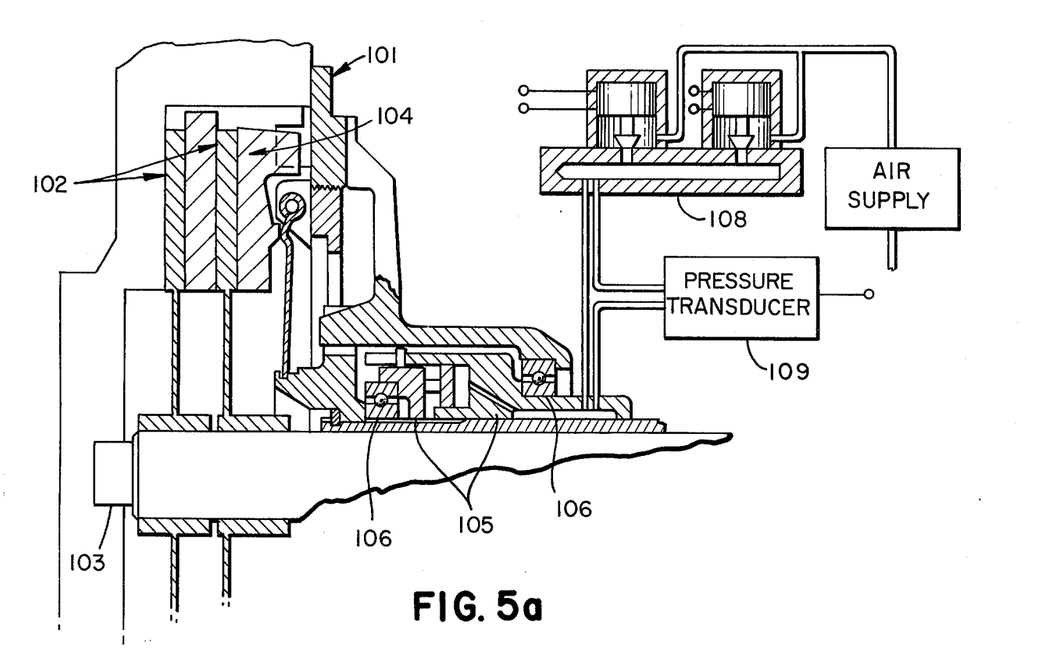
FIGS. 5a and 5b are cross sectional views of alternative embodiments of this invention.
Figure 5B:
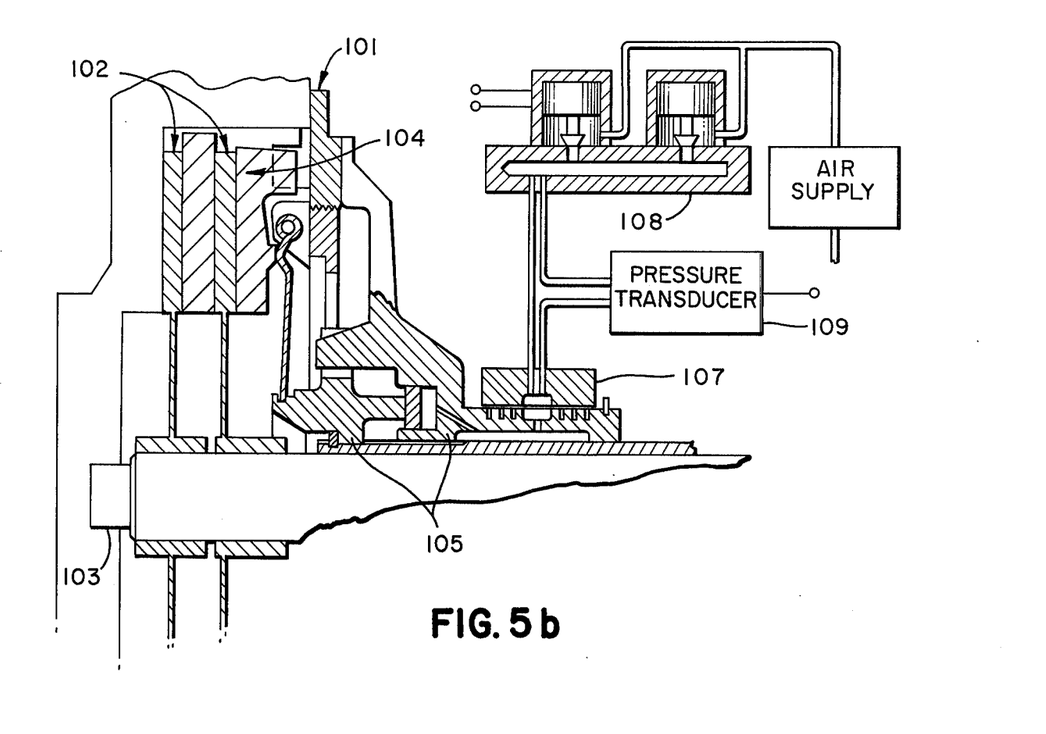

Alternate embodiments of this invention are shown in FIG. 5a and 5b with control shown in 5c. The engine fly wheel 101 is connected to the transmission input shaft 103 by means of clutch driven discs 102. The engagement torque being controlled by the axial force exerted by pressure plate 104 by means of fluid actuator 105. In FIG. 5a the fluid actuator force is conveyed through bearings 106 such that the fluid actuator does not rotate with the clutching elements. In 5b the fluid actuator force is conveyed to the pressure plate 104 without means of bearings such that the fluid actuator rotates with the clutching elements and working fluid is conveyed to fluid actuator by means of rotating seal member. In other respects, the embodiments shown in FIGS. 5a and 5b are similar in function. Control of the working fluid in the fluid actuator is by means of control device 108. As working fluid is admitted to the fluid actuator by means of control device 108, the driven clutch discs 102 are engaged with fly wheel 101. It can be seen that the combination of fluid actuator 105 and control device 108 will function in a manner similar to the actuator shown in FIG. 1. The working fluid in FIGS. 5a and 5b may be a hydraulic fluid connected to a suitable hydraulic pump; or alternatively, the working fluid may be compressed air supplied from the air brake system of the vehicle. In this embodiment the control device 108 may be an electro-hydraulic servo valve such as manufactured by Moog Inc., East Auroa, New York.

With valves of this type the controlled volume, 105 in FIG. 5 is connected to the high pressure fluid supply and to the fluid return or exhaust lines thru orifices. The effective orifice size can be varied by an electrical signal to the valve control winding. The construction is such that control signals which open the supply orifice simultaneously tend to constrict the return or exhaust orifice and vice versa. By this feature the fluid flow and/or fluid pressure in the controlled volume may be continuously varied in response to the electrical signal applied to the control winding.

Figure 6:
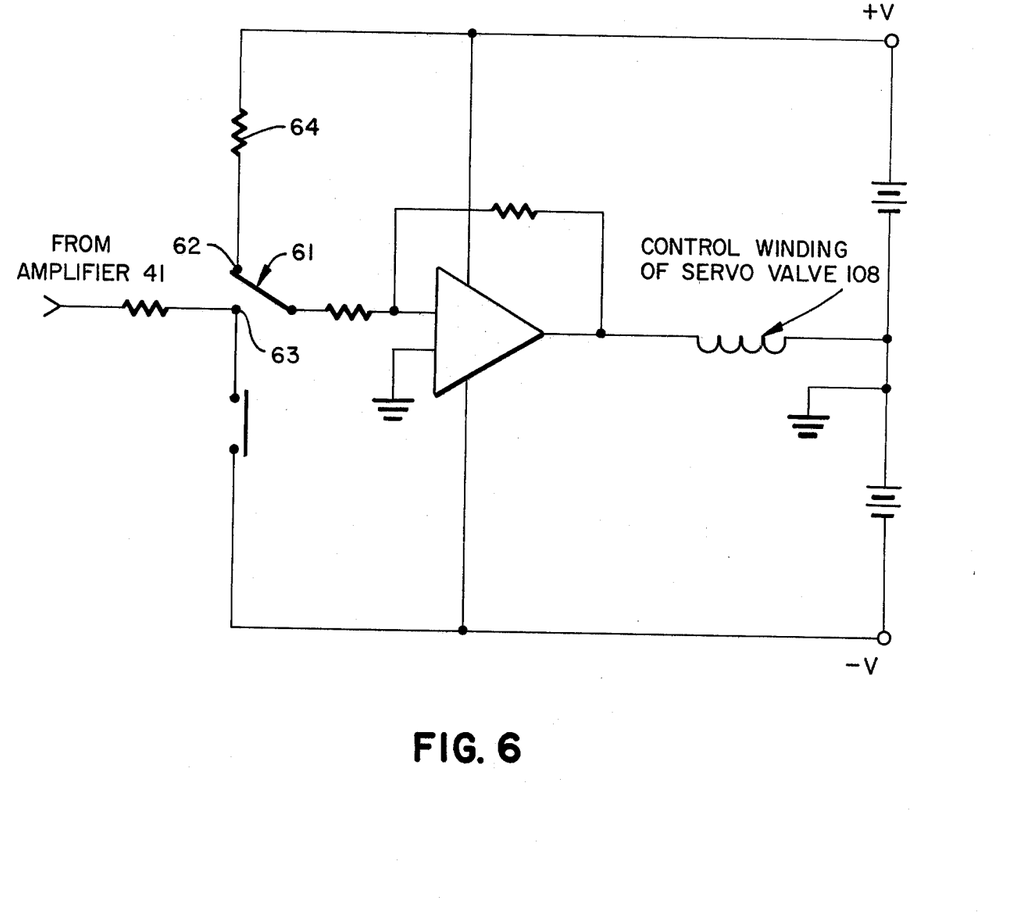
FIG. 6 is a drive stage suitable for use in the practice of this invention.

The basic control system for this embodiment is the same as previously described except that the power drive stage may be simplified. A suitable drive stage is shown in FIG. 6. The valve control winding 108a is connected to the arm 65 of switch 61. One contact 62 of this switch is connected thru resistor 64 to the positive voltage supply. The other contact 63 is connected to the output of amplifier 41. The operation of the switch is the same as has been previously described.

Shown in FIGS. 5a and 5b is a pressure transducer 109. This transducer provides an electrical output voltage the magnitude of which is proportional to the fluid pressure in the volume to which the transducer is connected. In clutches of the type shown in FIGS. 5a and 5b, the torque transmitted thru the clutch, while relative rotation exists between the driving and driven plates, is approximately proportional to the pressure on these plates. In the construction shown in FIGS. 5a and 5b this pressure is in turn proportional to the pressure in the fluid actuator 105, to which the pressure transducer 109 is attached. Thus the output from the transducer is approximately proportional to the torque. Using well known electrical design techniques, the output of this transducer may be multiplied with another signal equal to the difference in speed between the driving and driven clutch plates to produce a resultant signal.

This result signal is proportional to the power being dissipated in the clutching elements. Appropriate averaging of this signal provides an indication of the temperature rise of the clutch elements and may be used to protect these elements caused by excessive operation of the clutch in the slipping mode.

We claim:

1. A power controlled clutch for coupling a driven shaft to the crank shaft of an engine having an adjustable throttle comprising, first and second engageable clutch elements, said first clutch element being connected to said crank shaft and said second clutch element being connected to said driven shaft, control means for controlling the amount of engagement of said engageable clutch elements, said control means having a first state in which said first and second clutch elements are completely disengaged, a second state in which said first and second clutch elements are completely engaged providing a positive mechanical link between said crank shaft and said driven shaft, and a third state occurring during the transition from said first state to said second state, when said first and second engageable elements are partially engaged, said control means being operative during said third state to engage said first and second clutch elements sufficiently to maintain the speed of rotation of said drive shaft at a value in predetermined relation to the adjustment position of said throttle and the acceleration of said drive shaft.

2. A clutch in accordance with claim 1 wherein said control means further includes means for changing from said second state to said third state whenever said first and second clutch elements have been partially engaged for a sufficient time to exceed a predetermined amount of heat dissipation within said clutch.

3. A clutch in accordance with claim wherein said control means includes a first sensing element for sensing the rotational speed and change of rotational speed of said drive shaft and providing a first output signal proportional to the rotational speed of said driven shaft and a second output signal proportional to the acceleration of said crank shaft and wherein said control means includes means for providing an output signal which varies with variation in the adjustment of said throttle.

4. A controlled clutch in accordance with claim 1 wherein said control means operates in said third state to minimize the function F, where $$F = N - A + K\frac{dN}{dt},$$

where
A is a predetermined quantitative factor which
N is the engine speed,
dN/dt is the acceleration of said drive shaft, and
K is an adjustable weighting factor.

5. A controlled clutch in accordance with claim 4 and further including means for changing said control means from either said first or said second state whenever the integral value of a function $$f(A, N)$$

exceeds a predetermined value corresponding to an excessive heat absorption within said clutch.

6. A controlled clutch in accordance with claim 4 wherein A varies with variations in throttle position.

7. A controlled clutch for coupling a driven shaft to the crank shaft of an automotive engine having an adjustable throttle position comprising, first and second engageable clutch elements, said first clutch element being connected to said crank shaft and said second clutch element being connected to said driven shaft, control means for controlling the engagement of said first and second clutch elements, said control means including, an operator actuated control switch having a first position for disengagement of said clutch and a second position for re-engagement of said clutch, said control means operating in response to said switch being set to said first position to entirely disengage said first and second clutch elements, said control means operating in response to said control switch changing from said first position to said second position to partially engage said clutch elements sufficient to maintain said drive shaft at a speed of rotation in predetermined relation to the position of adjustment of said throttle and to the acceleration of said drive shaft and to thereafter completely engage said first and second clutch elements to provide a positive mechanical link between said crank shaft and said driven shaft.

8. A controlled clutch in accordance with claim 7 wherein said first and second clutch elements are driven into engagement by a linear actuator operated by an electrical motor and wherein said control means includes an electrical circuit for providing actuating current to said electric motor.

9. A controlled clutch in accordance with claim 7 wherein said control circuit includes means responsive to a condition where said crank shaft rotational speed and said throttle position have values over predetermined times sufficient to produce excessive heat absorption within said clutch, to change said first and second clutch elements from a partially engaged position to a completely disengaged position.

10. Apparatus in accordance with claim 8 wherein said control means includes a further operator actuating means allowing the operator to change the state of engagement of said first and second engageable clutch elements from being partially engaged to either being fully engaged or being fully disengaged.

11. A clutch in accordance with claim 9 wherein said control circuit provides an output signal to said operator whenever said first and second clutch elements have been partially engaged under conditions that generate excessive heat absorption within said clutch.

12. Apparatus in accordance with claim 9 and further including sensing means for providing first output signal indicating the adjustment position of said throttle, a second output signal indicative of the speed of rotation of said drive shaft and a third output signal indicative of the acceleration of said drive shaft.

13. A clutch in accordance with claim 9 wherein said control circuit additionally provides an output signal to said operator whenever the first and second clutch elements having been disengaged because of said heat absorption have dissipated sufficient heat to permit re-engagement of said first and second clutch elements.

* * * * *